(12) United States Patent
Card et al.

(10) Patent No.: US 7,223,224 B2
(45) Date of Patent: May 29, 2007

(54) AIRBAG FOLDING METHOD

(75) Inventors: Gary Andrew Card, Utica, MI (US); Jaime Fermin Perez, Rochester Hills, MI (US)

(73) Assignee: TK Holdings Inc., Auburn Hills, MI (US)

( * ) Notice: Subject to any disclaimer, the term of this patent is extended or adjusted under 35 U.S.C. 154(b) by 9 days.

(21) Appl. No.: 10/352,275

(22) Filed: Jan. 27, 2003

(65) Prior Publication Data

US 2004/0147385 A1  Jul. 29, 2004

(51) Int. Cl.
  *D31B 1/26* (2006.01)

(52) U.S. Cl. ............ 493/458; 493/405; 493/408; 493/455; 280/728.1; 280/730.1

(58) Field of Classification Search ........ 493/405, 493/408, 446, 1, 449, 455, 457, 458, 456; 280/728.1, 729, 730.1
See application file for complete search history.

(56) References Cited

U.S. PATENT DOCUMENTS

| 4,286,954 | A |   | 9/1981 | McArthur et al. | 493/244 |
|---|---|---|---|---|---|
| 5,348,341 | A |   | 9/1994 | Webber | 280/728 |
| 5,364,126 | A |   | 11/1994 | Kuretake et al. | 280/730 |
| 5,378,019 | A |   | 1/1995 | Smith et al. | 280/743 |
| 5,382,048 | A |   | 1/1995 | Paxton et al. | 280/728 |
| 5,478,113 | A |   | 12/1995 | Rogers | 280/743.1 |
| 5,492,367 | A |   | 2/1996 | Albright et al. | 280/743.1 |
| 5,496,056 | A |   | 3/1996 | Dyer | 280/728.1 |
| 5,520,408 | A | * | 5/1996 | Niederman | 280/728.1 |
| 5,570,900 | A |   | 11/1996 | Brown | 280/729 |
| 5,667,243 | A |   | 9/1997 | Fisher et al. | 280/730.2 |
| 5,694,737 | A | * | 12/1997 | Lunt et al. | 53/119 |
| 5,730,463 | A |   | 3/1998 | Fisher et al. | 280/743.1 |
| 5,732,973 | A | * | 3/1998 | Turnbull et al. | 280/743.1 |
| 5,752,714 | A |   | 5/1998 | Pripps et al. | 280/730.2 |
| 5,765,863 | A |   | 6/1998 | Storey et al. | 280/729 |
| 5,785,350 | A |   | 7/1998 | Inoue et al. | 280/743.2 |
| 5,791,685 | A |   | 8/1998 | Lachat et al. | 280/743.1 |
| 5,823,567 | A |   | 10/1998 | Behr et al. | 280/743.1 |
| 5,899,490 | A |   | 5/1999 | Wipasuramonton et al. | 280/730.2 |
| 5,906,395 | A |   | 5/1999 | Isaji et al. |   |
| 5,944,346 | A |   | 8/1999 | Lachat et al. | 280/743.1 |
| 5,960,611 | A | * | 10/1999 | Aigner et al. | 53/429 |
| 6,213,500 | B1 |   | 4/2001 | Jost et al. | 280/730.2 |
| 6,224,092 | B1 |   | 5/2001 | Sakamoto et al. | 280/730.2 |

FOREIGN PATENT DOCUMENTS

EP  0 968 887 A2  1/2000

* cited by examiner

*Primary Examiner*—Chris Harmon
(74) *Attorney, Agent, or Firm*—Foley & Lardner LLP

(57) ABSTRACT

A part of a distal end portion of an airbag is tucked into an interior thereof. A plurality of overlapping longitudinal folds are formed in first and second halves of the airbag, and the folded distal and proximal portions of the airbag are each folded substantially transverse to the longitudinal folds so as to form two compact fold bodies.

20 Claims, 5 Drawing Sheets

AIRBAG FOLDING METHOD

TECHNICAL FIELD

The present invention relates generally to inflatable restraint devices for motor vehicles, and more particularly to a method of folding such a device.

BACKGROUND OF THE INVENTION

In recent years, engineering efforts in automobile safety systems have increasingly focused on inflatable restraint devices and methods/systems for their deployment. Of particular interest to designers are methods of folding the inflatable device or airbag to optimize the manner in which it deploys. Designs differ among the different types of airbags, for example, driver side, passenger side and side-impact airbags offer varying optimal deployment characteristics. Moreover, different vehicle structures as well as size and type of inflatable restraint apparatuses all provide different, sometimes competing considerations when developing airbag fold designs. For example, children or other relatively small occupants may have different requirements than larger occupants when it comes to optimizing vehicle safety systems. Complicating matters further, occupants may be out of a normal riding position during airbag deployment. There are thus continuing challenges to engineering broadly applicable systems that will operate effectively in view of the broad range of vehicle and occupant characteristics.

SUMMARY OF THE INVENTION

The present invention provides a method of folding an airbag for insertion in a housing in a vehicle. The method includes the steps of tucking an end region of the airbag inwardly, thereby forming upper and lower regions of the airbag bounding the tucked end region. The method further includes the step of forming a plurality of overlapping longitudinal folds in first and second halves of the airbag. Finally, the method includes forming a plurality of transverse folds in proximal and distal portions of the airbag. The result is a compact arrangement having two separate fold bodies. Upon deployment, a first of the fold bodies is inflated substantially upward, toward the vehicle windshield. A second fold body is deployed outwardly and downwardly, substantially following a profile of the instrument panel.

DETAILED DESCRIPTION OF EMBODIMENTS

Figure 1:
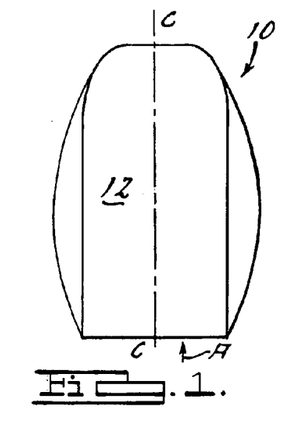
FIG. 1 is a top view of an airbag device in an unfolded condition.
Figure 1A:
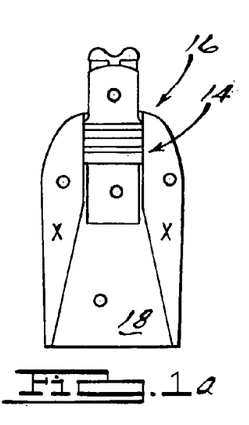
FIG. 1a is a bottom view of an airbag device in an unfolded condition.
Figure 1B:
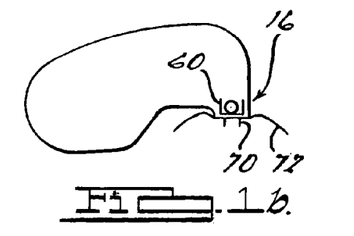
FIG. 1b is a side cross-sectional view of an airing device in an inflated condition.
Figure 18:
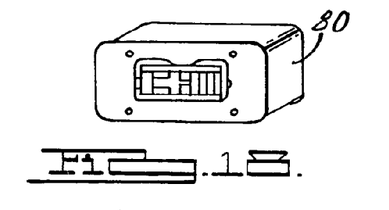
FIG. 18 is an airbag folded according to an embodiment of the present invention and an airbag housing for insertion of the folded airbag therein.

Referring to FIG. 1, there is shown a top view of an airbag 10 having a top surface 12. "C" represents the longitudinal centerline of airbag 10. The presently disclosed airbag folding method is applicable to airbags of any known design, and may be utilized with airbags positioned at various points in the automobile, for instance, top-mounts, mid-mounts, and lower-mounts, as well as in side-impact and driver-side systems. However, the method is illustrated herein in a top-mounted passenger-side system, using an elongate airbag such as the illustrated airbag 10 having an inflation opening or throat 14 disposed proximate a first end 16. Illustrative bottom and side views, respectively, of airbag 10 are shown in FIGS. 1a and 1b. In the illustrative airbag described herein, throat 14 opens in a bottom surface 18 of the airbag 10. Those skilled in the art will appreciate that square, round, and other airbags may be folded according to the present invention. In one embodiment, the airbag 10 is attached by any known means to an inflator-airbag housing 80 (see FIG.18) near the throat 14. Inflator-Airbag housing 80 is, for example, secured adjacent the throat 14 by inserting a plurality of pegs-fasteners 70 (e.r. Studs) (see FIG. 10 ) through matching holes in the airbag (not shown). It should be appreciated that the various illustrations referred to herein are merely illustrative of the airbag folding method, as well as the airbag and inflatable restraint system components that may be used in the practice of the present invention. Therefore, the various dimensions, proportions and materials illustrated should not be taken to limit the manner in which the invention may be practiced.

In general, the presently disclosed folding method comprises tucking an end region of the airbag into an interior, followed by forming a plurality of folds in a longitudinal direction. As used herein, the term longitudinal refers to the direction running substantially along a long axis of the airbag, from an end region toward the airbag throat. After forming the longitudinal folds, the airbag is folded into two fold bodies, which are covered with a protective wrapping, and the airbag placed into a container, which is mounted in a vehicle instrument panel 110. The method is, for example, begun by initially laying the subject airbag substantially flat on a work surface such as a table. The various folding steps disclosed herein may be facilitated by substantially flattening each fold (and therefore the entire airbag) once made, however, the process can be carried out without flattening the airbag if desired. Once airbag 10 is laid flat on the work surface, a portion of airbag 10 substantially opposite the throat 14, a distal portion 11 (see FIG. 10-20, discussed below) is tucked inwardly, i.e. invaginated, and the bag flattened once again. Arrow "A" in FIG. 1 indicates an example of the direction of a first initial tuck-fold.

Figure 2:
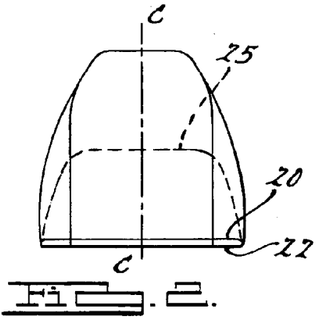
FIGS. 2-9 are perspective views of an airbag similar to FIG. 1, illustrating sequential steps in a folding method according to the present invention.

As illustrated in FIG. 2, the step of tucking a part of the distal portion 11 toward the interior renders an upper lip 20 and a lower lip 22 bounding the tucked region. In FIG. 2, the interior boundary of the tucked end region is represented by dashed line 25. A variety of means may be employed whereby the tucked region is formed having the desired dimensions, however, the tucking step, for example takes place by manual manipulation, and there is a relatively large tolerance in the acceptable depth of the tucked region. The tucked region is, for example, between about ¼ and about ½, for example, about ⅓, the unfolded length of the airbag. To facilitate retention of the airbag in its various transitional folded states according to the present invention, a clip, clamp or other releasable fastener can be used to secure airbag 10 to the work surface, for example, at approximately centerline "C."

Figure 3:
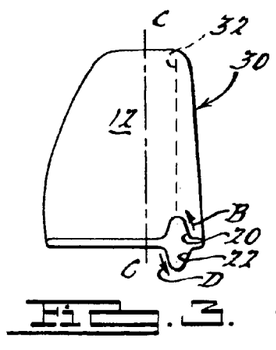
Figure 4:
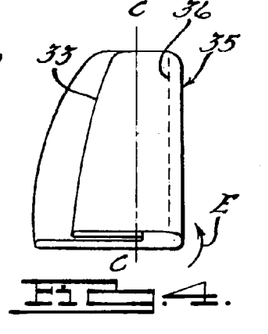

After the initial tucking step, a plurality of longitudinal folds are formed in left and right halves of airbag 10, "left" and "right" being defined relative to centerline C. Referring to FIG. 3, there is shown the next step according to a preferred method of folding airbag 10 wherein upper 20 and lower 22 lips/edges-20-and-23 are spread apart manually at a first point, for example, substantially medial to centerline C and a longitudinal edge or periphery 30 of airbag 10. It should be appreciated that the folds disclosed herein have a tolerance that generally ranges from 10 millimeters to 15 millimeters, although the present method should not thereby be limited. It has been found that when the folds are made within this general range, the airbag can be most easily fitted into a conventional airbag module housing. As the upper 20 and lower 22 lips-20-and-23 are spread apart, an upper surface/region 12 and lower surface/region 18 (not shown in FIG. 3) are, for example, folded and simultaneously drawn apart substantially along a line represented in FIG. 3 by dashed line 32. Upper 12 and lower 18 surface/regions-12-and-14 are, for example, drawn apart in substantially opposed directions represented by arrows "B" and "D" in FIG. 3, respectively. Upper surface/region 12 is, for example, folded along line 32, and drawn inwardly across centerline C. As used herein, the term "inwardly" refers to a direction toward the vehicle centerline C relative to the longitudinal edges of the airbag, while "outwardly" refers to a substantially opposite direction, i.e. away from the centerline C. Thus, a first portion of airbag 10 is folded across centerline C to render the folded body illustrated in FIG. 4, having a first right inner fold edge 33. By drawing apart the upper 12 and lower 18 regions, first right inner fold edge 33 "originates" at a point in upper region 12 that is substantially medial to centerline C and an outer edge, or periphery 30 of airbag 10, airbag 10, relative to the airbag as pictured in FIG. 3. Substantially simultaneous with this folding step, lower lip 22 is, for example, longitudinally folded along a line along lower region 18 (not shown in FIG. 4) that corresponds to line 32 in upper surface 12, thereby creating a first right outer fold edge 35. In a manner similar to the first right inner fold edge 33, first right outer fold edge 35 originates (relative to the airbag as pictured in FIG. 3) substantially medial to centerline C and the airbag periphery 30, in lower region 18. Subsequently, a second portion of airbag 10 is then folded inwardly along a fold line represented in FIG. 4 by dashed line 36. Arrow "E" represents the approximate direction of folding in FIG. 4.

Figure 5:
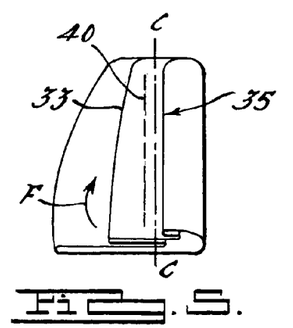
Figure 6:
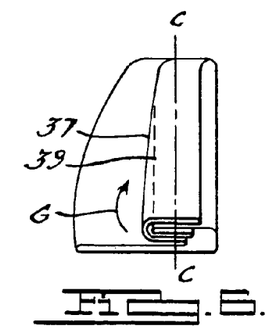

Referring now to FIG. 5, the aforementioned inward folding of the second portion of airbag 10 (arrow E in FIG. 4) brings first right outer fold edge 35 inwardly, and substantially aligns edge 35 along centerline C. Subsequently, the first right inner fold edge 33 is folded outwardly, across centerline C, the approximate folding direction represented by arrow "F," and the positioning of the fold represented by dashed line 40. This folding step creates a second right inner fold edge 37. In one embodiment, a further step of folding second right inner fold edge 37 outwardly across centerline C is undertaken, the fold line represented by dashed line 39, and the direction of folding approximately shown by arrow "G." The result is the folded body illustrated in FIG. 7, wherein upper surface 12 is substantially continuous (not folded) across the folded airbag body. The aforementioned steps thus yield an airbag with one half of the airbag body relatively compactly folded with a plurality of longitudinal folds. During or between each of the various folding steps, releasable fasteners such as clips or clamps may be used to temporarily hold the airbag in the desired position, and removed when no longer necessary.

Figure 7:
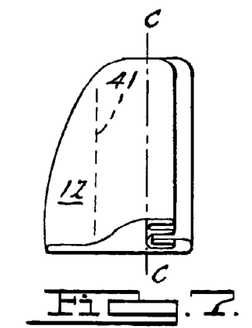
Figures 8, 9, 10, 11:
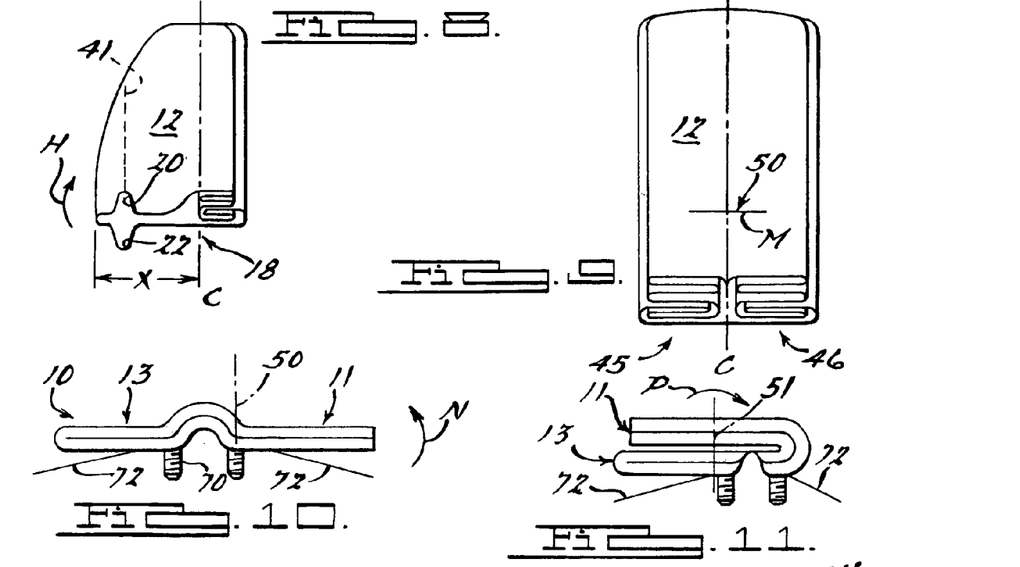
FIG. 10 is a side view of the folded airbag of FIG. 9.
FIGS. 11-16 are side views of an airbag similar to FIG. 10, illustrating sequential steps in a folding method according to the present invention.

Once a first half of the airbag is folded as described, a second half of the airbag is, for example, folded in a substantially identical fashion. As illustrated in FIGS. 7 and 8, the second half of the airbag is manipulated in a fashion similar to that described with respect to the first half. Upper 20 lower 22 lips, respectively, and ultimately upper 12 and lower 18 surface/regions and, are separated, and top surface 12 and bottom surface 18 folded along the line represented by dashed line 41. In FIG. 8, arrow "H" represents the approximate direction of folding. Similar to the aforementioned steps undertaken relative to the right half of airbag 10, the various folding steps for the left half result in first and second left inner fold edges (not shown), and a first left outer fold edge (not shown). By following similar, mirror image steps to those recited with respect to the first half of airbag 10, the folded body of FIG. 9 is produced. In particular, the left half of airbag 10 (zone X in FIG. 8) is folded a plurality of times in an overlapping fashion, rendering the folded body of FIG. 9, which has a continuous (unfolded) top surface 12, and two substantially aligned longitudinal fold bodies 45 and 46, that are folded in substantially mirror image fashion.

Upon folding the subject airbag into the folded body illustrated in FIG. 9, the airbag is folded a plurality of times along fold lines oriented substantially perpendicular to the direction of the longitudinal folds. Referring now to FIG. 10, there is shown a side view of airbag 10, as folded and illustrated in top view in FIG. 9. As shown in FIG. 10, airbag 10 has a distal portion 11 and a proximal portion 13. FIG. 10 also shows mounting pegs-fasteners 70 (e.r. studs) of an airbag retainer (not shown), extending from the underside of airbag 10, and a flexible airbag wrap 72. Distal portion 11 is, for example, folded at a fold line represented by dashed-reference line 50, in a direction substantially transverse to the direction of the longitudinal folds described with regard to FIGS. 1-9. For example, referring to FIG. 9 and with respect to the orientation thereof, the airbag 10 may be marked with a horizontal line M located a predetermined distance from the upper lip/edge 20 of the tucked region for aligning the transverse fold in the distal portion 11 of the airbag 10. The approximate direction of folding is shown by arrow "N." It should be appreciated that the embodiments described herein may be deviated from without departing from the scope of the present invention. In particular, the number and relative dimensions of the folds might be varied. Moreover, it should be appreciated that although FIG. 10 illustrates distal 11 and proximal 13 portions 11 and 13 as having substantially identical dimensions, the respective portions may vary in size significantly without from the scope of the present invention.

Figure 12:
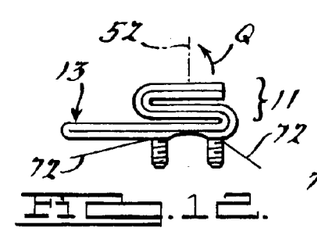
Figure 13:
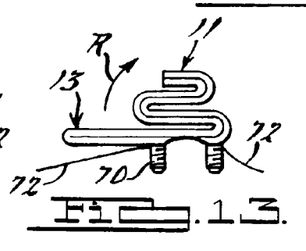
Figure 14:
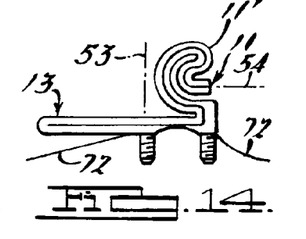
Figures 15, 16:
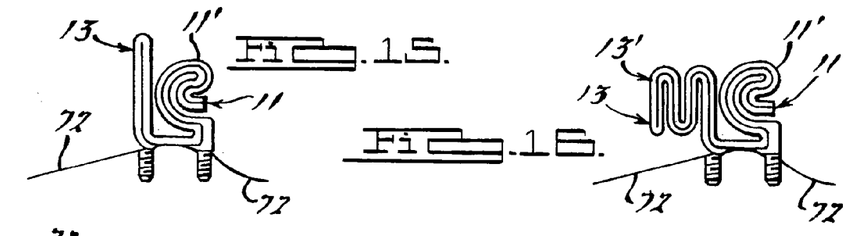
Figure 17:
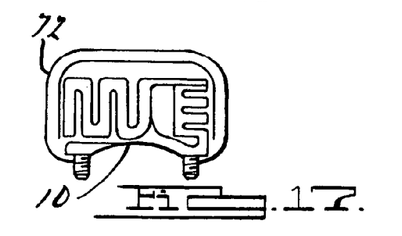
FIG. 17 is a side view of an airbag folded according to an embodiment of the present invention.

FIG. 11 illustrates the step of folding distal portion 11 over proximal portion 13. FIG. 11 further illustrates a fold-reference line 51 at the location of a corresponding fold line, along which distal portion 11 is, for example, folded a second time, the direction of folding shown approximately by arrow P, yielding the configuration shown in FIG. 12. The folded airbag body pictured in FIG. 12 is folded again by folding the end of distal portion 11 at a fold line indicated by reference line 52, the direction of folding approximately shown by arrow Q, yielding the folded body shown in FIG. 13. At this point, distal portion 11 has been folded into a relatively compact folded body 11' having a plurality of folded sections oriented substantially parallel to one another. Subsequently, distal portion 11 is rolled/folded as a unit in a distal direction, the direction of rolling/folding shown in FIG. 13 approximately by arrow R, yielding a configuration similar to that shown in FIG. 14. Proximal portion 13 is then, for example folded upwardly at a fold line indicated by reference line 53. Next, proximal portion 13 is folded a plurality of times to yield a relatively compact folded body 13' having a plurality of substantially parallel accordion fold sections, aligned substantially perpendicular to the nominal direction 54 of the corresponding fold sections of distal portion 11. Upon forming the folded distal 11 and proximal 13 portion 11 and 13, respectively, in intimate association as shown in FIG. 16, airbag wrap 72 can be wrapped over the entire airbag 10, and secured to pegs-fasteners 70 (e.g. studs), as shown in FIG. 17. In a one embodiment, proximal portion 13 is larger than the fold body 11' of distal portion 11, however, for clarity the respective fold bodies have been illustrated as having similar dimensions. The folded airbag 10 is then positioned in an airbag housing 80, and ultimately mounted in a motor vehicle 108, for example, in a conventional manner in the vehicle instrument panel 110. Where the folded airbag 10 is larger than the airbag housing 80, the folded airbag 10 can be squeezed/deformed slightly to allow it to fit therein.

Figure 19:
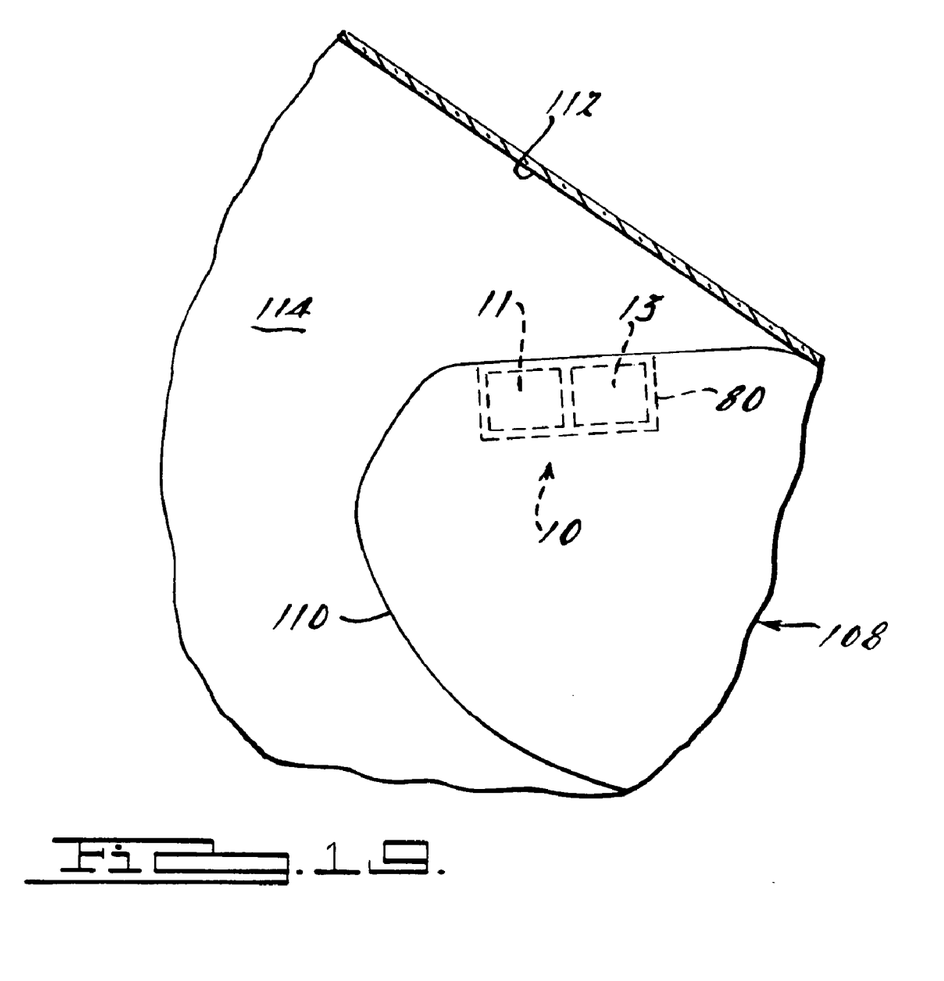
FIG. 19 is a partial side view of a vehicle wherein an airbag folded according to the present invention is positioned in the vehicle instrument panel.
Figure 20:
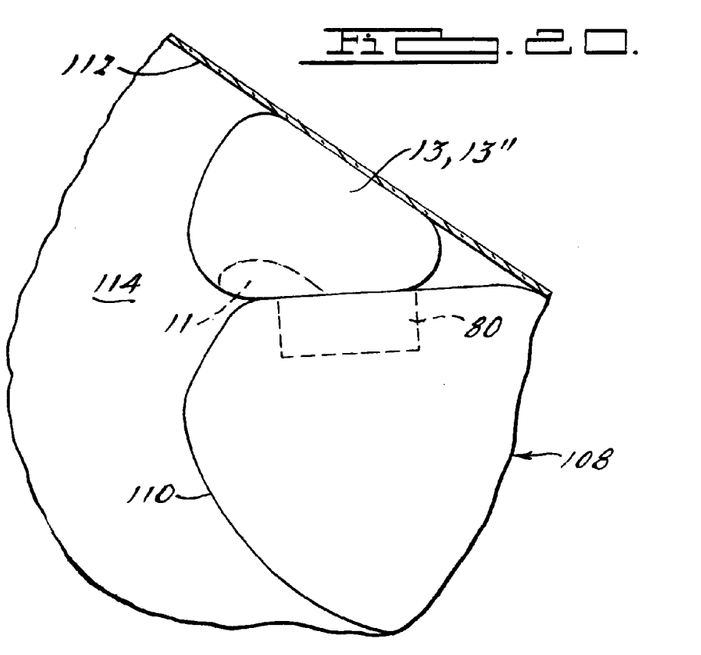
FIG. 20 is a partial side view of an airbag similar to FIG. 19, illustrating the airbag in a partially deployed state.
Figure 21:
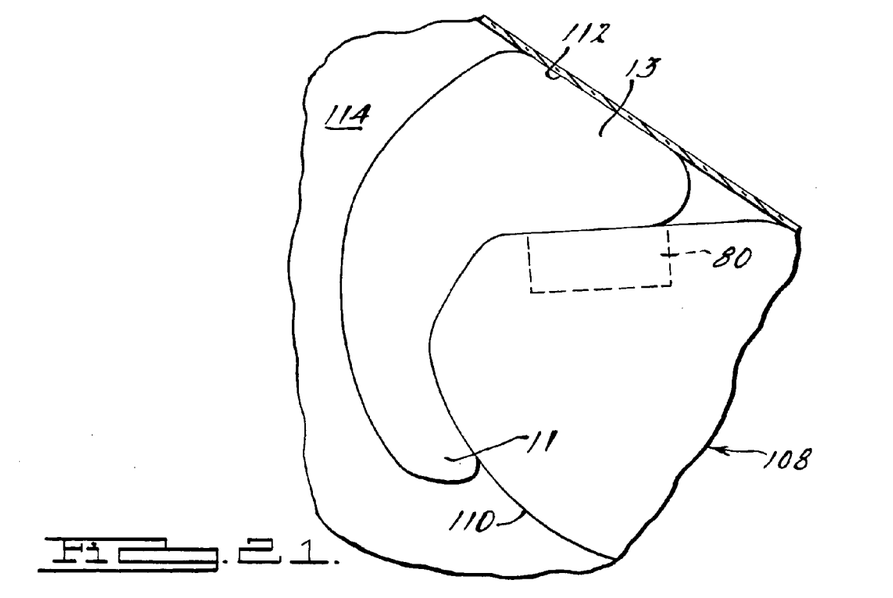
FIG. 21 is a partial side view similar to FIG. 20, illustrating the airbag in a substantially fully inflated state.

Airbag 10 is, for example, activated during or just prior to a crash or sudden vehicle deceleration. In one embodiment, the associated vehicle 108 is equipped with a crash sensor (not shown), which sends an electrical activation signal to a gas generator/inflator (also not shown) for supplying inflation gas to airbag 10. The signal, for example, induces the rapid production/release of inflation gas in a manner well known in the art. The gas is, for example, directed into airbag 10, causing rapid inflation thereof. Airbag 10 bursts through or displaces the various airbag covers, trim panels, etc. used in housing the airbag system, in a manner also well known in the art. In one embodiment, airbag 10 is positioned in the vehicle instrument panel 110 such that proximal portion 13 is oriented substantially toward the vehicle windshield 112. Referring to FIG. 19, there is shown a partial side view of an exemplary vehicle passenger compartment 114, with airbag 10 mounted therein, within the associated vehicle instrument panel 110. As illustrated, proximal portion 13 is oriented substantially toward the vehicle windshield 112, while distal portion 11 is oriented substantially toward the vehicle passenger compartment 114. Referring now to FIG. 20, there is shown airbag 10 shortly after an activation signal is sent to the vehicle airbag system. During an inflation event, proximal portion 13 initially fills with inflation gas more quickly than distal portion 11. It is believed that this is due at least in part to the tucking of the end region of airbag 10, as illustrated in FIGS. 1 and 2. Because of the tucking step, frictional interaction between the layers of the tucked region imparts resistance to the force of inflation gas in the distal portion 11 that is greater than frictional interaction between the layers of the un-tucked, proximal portion 13. Consequently, distal portion 11 expands more slowly than proximal portion 13. As illustrated in FIG. 20, proximal portion 13 inflates and expands upwardly relative to the vehicle instrument panel 110, for example, contacting the vehicle windshield 112. At least a portion of the partially inflated "bubble" 13" of proximal portion 13 is thereby positioned to contact/cushion part of the body (typically the head or chest) of a vehicle occupant positioned proximate the vehicle instrument panel 110. For example, the "bubble" 13" will be positioned to cushion the head of an occupant during a crash. The point and locations at which an occupant actually contacts the inflating airbag 10 will depend on many factors, including the characteristics of the crash, the position of the occupant prior to the crash, and whether or not the occupant is wearing a seat belt. After initial partial inflation of proximal portion 13/bubble 13", further inflation of distal portion 11 begins. It should be appreciated that distal portion 11 begins to inflate at substantially the same time that proximal portion 13 begins to inflate, however, as described, inflation of proximal portion 13 takes place more quickly than inflation of distal portion 11. Thus, shortly after airbag 10 is inflated to the state shown in FIG. 20, distal portion 11, for example, begins to expand into the vehicle occupant compartment 114. As distal portion 11 inflates, the tucked region is untucked/unfolded, and distal portion 11 is expanded outwardly and downwardly, substantially following the contour of the instrument panel. In one embodiment, distal portion 11 is substantially "wedged" between a vehicle occupant (not shown) and the instrument panel 110. The initial inflation of proximal portion 13 contributes to the downward projection of distal portion 11, and assists in unfolding the longitudinal folds or pleats, formed during the steps pictured in FIGS. 1-9, giving distal portion 11 a greater tendency to expand outwardly early in its deployment. Specifically, when proximal portion 13 inflates upwardly toward the vehicle windshield 112, the "bubble" 13" has a tendency to force the still partially folded distal portion 11 outward and downward, assisting in positioning portion 11 such that its inflation trajectory will lie substantially between the vehicle instrument 110 panel and the vehicle occupant. Referring to FIG. 21, there is illustrated airbag 10 in a substantially fully inflated state.

The distal portion 11 of the airbag 10 can be tucked to varying degrees. For example, where it is desirable to deploy the airbag 10 such that a greater proportion of the airbag 10 wedges between the occupant and the vehicle instrument panel 110, or does so earlier in deployment, the airbag 10 can be folded with a relatively shallow tuck. Conversely, where it is desirable to deploy the airbag 10 such that a lesser proportion of the airbag 10 wedges between the occupant and the vehicle instrument panel 110, or does so later in deployment, the airbag 10 can be folded having a relatively deep tucked region. Because the folded airbag 10 wedges between the vehicle instrument panel 110 and the occupant, the deployment kinematics are significantly improved over earlier designs. For instance, rather than projecting an end of an airbag rapidly toward a vehicle occupant, in some instances producing a risk of injury, the airbag 10 is deployed substantially between the occupant and the vehicle instrument panel 110, and spreads the force of the inflation over a larger area of the body of the occupant. Such a design also reduces the likelihood, in certain situations, that the airbag 10 will descend forcefully on the head of the occupant, a situation that may occur where an occupant is out of a normal riding position.

Figure 22:
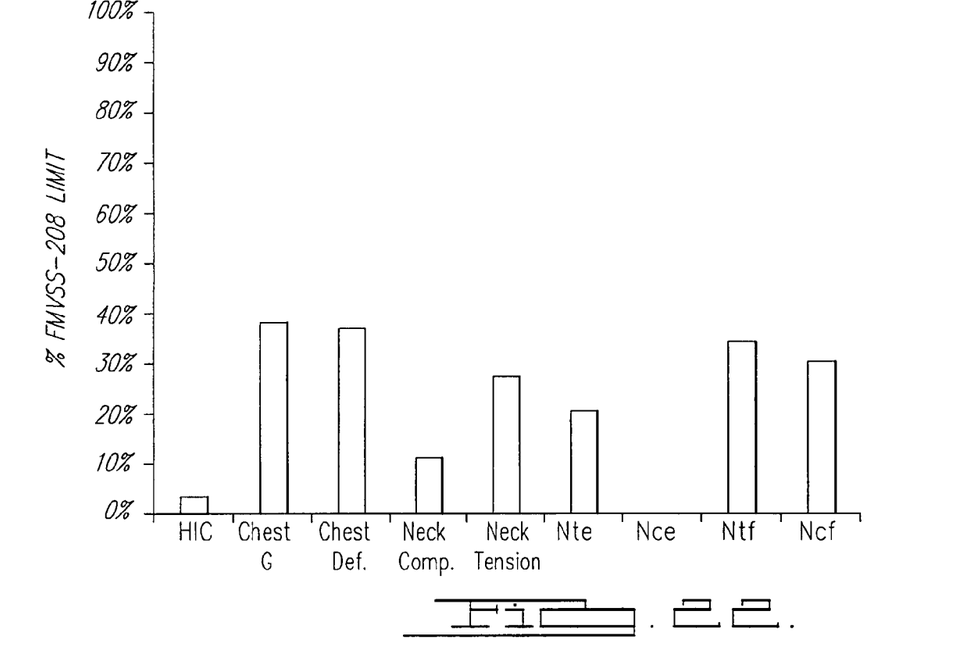
FIG. 22 illustrates various percentages of the associated Federal Motor Vehicle Safety Standards-208 injury limits for a 3-year old child dummy with its chest positioned proximate to an instrument panel containing an airing system, for an airbag deployment test, for various associated injury measures.
Figure 23:
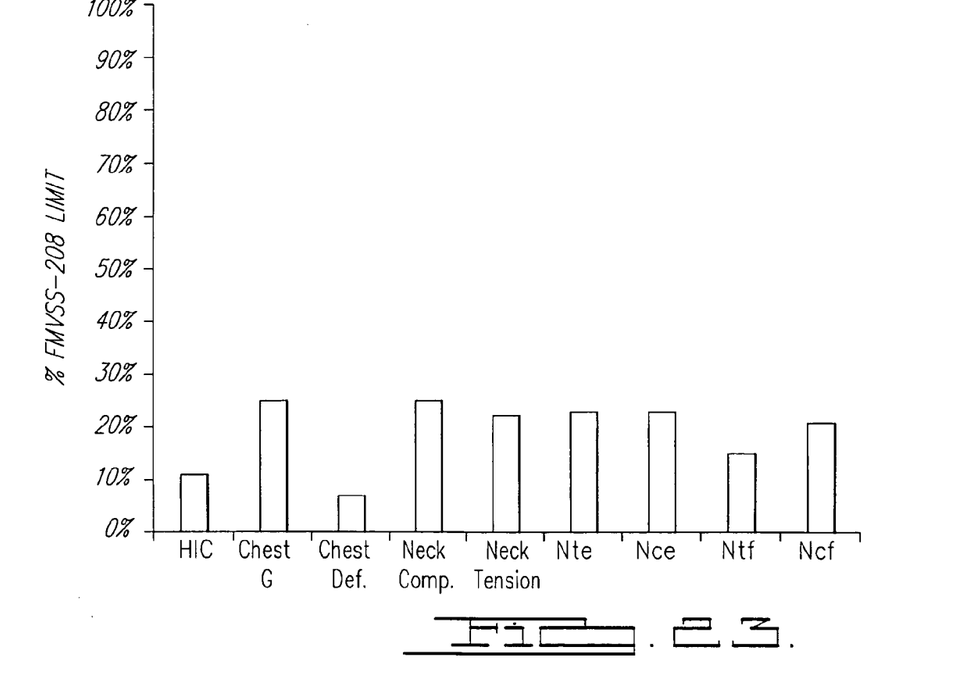
FIG. 23 illustrates various percentages of the associated Federal Motor Vehicle Safety Standards-208 injury limits for a 3-year old child dummy with its head positioned proximate to an instrument panel containing an airbag system, for an airbag deployment test, for various associated injury measures.

Various quantitative measures of performance are shown in FIGS. 22 and 23, below. FIG. 22 illustrates performance data collected in airbag deployment tests utilizing a dummy 3-year-old in a position known as NHTSA-1, generally a position with the head of the dummy proximate the vehicle instrument panel 110 prior to airbag deployment. Performance data in other tests (not shown), for example, with a 6-year-old dummy, also fell well within applicable standards. FIG. 23 illustrates performance data collected in airbag deployment tests utilizing a dummy 3-year-old in a position known as NHTSA-2, generally a position wherein the chest of the dummy is positioned proximate the vehicle instrument panel 110 prior to airbag deployment. The vertical axes of FIGS. 22 and 23 represents the Federal Motor Vehicle Safety Standards-208 (FMVS 208 Final Rule (December 2001)) with 100% representing the maximum allowable measure for various performance criteria. The horizontal axes set forth the various parameters tested, and the bars correspond to those parameters represent the percent of maximum levels allowed/recommended by the National Highway Transportation Administration. In FIGS. 22 and 23, the variables tested were as follows:

| | |
|---|---|
| HIC | Head Injury Criteria |
| Chest G | Chest Acceleration (G's) |
| Chest Def | Chest Deflection |
| Neck comp | Neck Compression |
| Neck tension | |
| Nte | Neck Tension Extension |
| Nce | Neck Compression Extension |
| Ntf | Neck tension flexion |
| Ncf | Neck compression flexion |

In summary, the presently disclosed folding method provides deployment of an airbag that as tested, has performance characteristics well within the Federal standards. The various performance and kinematics criteria, and methods for testing the airbag deployment, as well as performing the calculations necessary in determining values of the above-referenced variables, are all well known in the vehicle safety arts.

The present description is only for illustrative purposes; the description and illustrations herein should not be construed to narrow the scope of the present invention in any way. Thus, those skilled in the an will appreciate that various alterations could be made to the presently disclosed embodiments without departing from the spirit and scope of the present invention. For instance, embodiments are contemplated in which tethers are utilized to assist in optimizing the deployment trajectory of the inflating airbag 10. One such embodiment (not shown), that may be used in designs wherein the airbag 10 is mounted on top of the vehicle instrument panel 110, utilizes a tether fastened to the inside of the airbag 10, preventing an end or top region of the airbag 10 from being projected farther into the vehicle passenger compartment 114 than desired. The tethers may be attached at varying points in the airbag 10, and optimal designs depend on the specific vehicle dimensions. Such tethers have also been shown to be useful in volume control of the airbag 10. When the airbag 10 is maximally expanded under the restraint of the tether(s), excess inflation gas can be discharged through vents in the airbag 10. By limiting expansion of the proximal portion of the airbag 10, the tether forces more inflation gas to enter and inflate the distal portion of the airbag 10. Other aspects, features, and advantages will be apparent upon an examination of the drawing figures and appended claims.

What is claimed is:

1. A method of folding an airbag, comprising:
   a. tucking a part of a distal portion of an unfolded airbag into an interior of the airbag;
   b. forming a plurality of overlapping longitudinal folds in the first and second halves of the airbag, wherein the step of forming the plurality of overlapping longitudinal folds in the first and second halves of the airbag comprises:
      i. forming a first set of substantially opposed longitudinal folds in upper and lower regions of the airbag, and bringing a first portion of the upper region inwardly across a centerline, a fold line therefrom in the upper region defining a first right inner fold edge, and a fold line therefrom in the lower region defining a right outer fold edge;
      ii. forming a second set of substantially opposed longitudinal folds in the upper and lower regions and folding a second portion of the upper region inwardly across the centerline, a fold line therefrom in the upper region defining a first left inner fold edge, and a fold line therefrom in the lower region defining a left outer fold edge;
      iii. bringing the right outer fold edge inwardly toward the centerline;
      iv. bringing the first right inner fold edge outwardly to overlap the right outer fold edge, thereby folding the airbag along a longitudinal fold line defining a second right inner fold edge;
      v. bringing the second right inner fold edge outwardly to overlap the first right inner fold edge and the right outer fold edge;
      vi. bringing the left outer fold edge inwardly toward the centerline;
      vii. bringing the first left inner fold edge outwardly to overlap the left outer fold edge, thereby folding the airbag along a fold line defining a second left inner fold edge; and
      viii. bringing the second left inner fold edge outwardly to overlap the first left inner fold edge and the left outer fold edge;
   c. folding a proximal portion of the airbag a plurality of times along fold lines substantially transverse to an orientation of the longitudinal folds, thereby forming a first fold body; and
   d. folding the distal portion of the airbag a plurality of times along fold lines substantially transverse to the orientation of the longitudinal folds, thereby forming a second fold body.

2. The method of claim 1, wherein the tucking step comprises tucking a part of the airbag that is between about ¼ and about ½ of the length of the airbag.

3. The method of claim 2, wherein the tucking step comprises tucking a part of the airbag that is about ⅓ of the length of the airbag.

4. The method of claim 1, wherein the step of folding the proximal portion of the airbag comprises forming the first fold body such that it includes a plurality of substantially parallel first fold sections; and the step of folding the distal portion of the airbag comprises forming the second fold body such that it includes a plurality of substantially parallel second fold sections, the second fold sections being oriented substantially perpendicular to the first fold sections of the proximal portion.

5. The method of claim 1, wherein upon supplying an inflation gas to the airbag, the first fold body inflates initially relatively more rapidly than the second fold body, a frictional interaction between adjacent layers of the second fold body imparting more resistance to unfolding than a frictional interaction between adjacent layers of the first fold body.

6. The method of claim 5, wherein the tucking step comprises tucking a part of the airbag that is between about ¼ and about ½ of the length of the airbag.

7. The method of claim 5, wherein upon supplying the inflation gas to the airbag, inflation of the proximal portion assists in projecting the distal portion in a desired direction.

8. A method of folding an airbag as recited in claim 5, wherein the step of tucking the part of the distal portion of the unfolded airbag into the interior of the airbag defines upper and lower regions, and at least one of the longitudinal folds is formed by folding the upper region between a centerline and a side edge of the airbag and by folding the lower region at a corresponding location opposed thereto.

9. A method of folding an airbag as recited in claim 1, wherein the step of tucking the part of the distal portion of the unfolded airbag into the interior of the airbag thereby defines upper and lower regions of the airbag bounding a tucked region, longitudinally folding the airbag along a first fold originating in the upper region between a longitudinal centerline and the right peripheral edge; and longitudinally folding the airbag along a second fold originating in the upper region between the longitudinal centerline and the left peripheral edge.

10. A method of folding an airbag of an airbag apparatus for motor vehicles for insertion in a container, the method comprising the steps of:
  tucking an end region of the airbag into the interior such that the end region is invaginated in the interior of the airbag, thereby forming a tucked region, the tucked region thereby defining upper and lower regions of the airbag;
  inwardly folding a first portion of the airbag, a folded edge of the first portion originating in the upper region substantially medial to a longitudinal centerline and a periphery of the airbag;
  inwardly folding a second portion of the airbag;
  outwardly folding the first portion of the airbag to overlap the second portion;
  inwardly folding a third portion of the airbag, a folded edge of the third portion originating in the upper region substantially medial to the longitudinal centerline and a periphery of the airbag;
  inwardly folding a fourth portion of the airbag;
  outwardly folding the third portion to overlap the fourth portion;
  forming a first fold body by folding the airbag a plurality of times along fold lines oriented substantially perpendicular to the longitudinal centerline; and
  forming a second fold body by folding the airbag a plurality of times along fold lines oriented substantially perpendicular to the longitudinal centerline.

11. The method of claim 10, wherein the step of forming the first fold body comprises folding a distal portion of the airbag a plurality of times, the first fold body having a plurality of fold sections oriented substantially mutually parallel; and the step of forming the second fold body comprises folding a proximal portion of the airbag a plurality of times, the second fold body having a plurality of fold sections oriented substantially mutually parallel, and substantially perpendicular to an orientation of the fold sections of the first fold body.

12. The method of claim 10, further comprising the step of marking a transverse line on the airbag a predetermined distance from an edge of the tucked region for aligning of a transverse fold in the distal portion of the airbag.

13. The method of claim 10, further comprising the steps of:
  forming a first set of substantially opposed longitudinal folds in the upper and lower regions, and bringing a first portion of the upper region inwardly across a centerline, a fold line therefrom in the upper region defining a first right inner fold edge and a fold line therefrom in the lower region defining a right outer fold edge; and
  forming a second set of substantially opposed longitudinal folds in the upper and lower regions, and bringing a second portion of the upper region inwardly across the centerline, a fold line therefrom in the upper region defining a first left inner fold edge and a fold line therefrom in the lower region defining a left outer fold edge.

14. A method of folding an airbag, comprising the steps of:
  tucking a part of a distal portion of an unfolded airbag into an interior of the airbag;
  forming a first set of substantially opposed longitudinal folds in upper and lower regions of the airbag, and bringing a first portion of the upper region inwardly across a centerline, a fold line therefrom in the upper region defining a first right inner fold edge, and a fold line therefrom in the lower region defining a right outer fold edge;
  bringing the right outer fold edge inwardly toward the centerline;
  bringing the first right inner fold edge outwardly to overlap the right outer fold edge, thereby folding the airbag along a longitudinal fold line defining a second right inner fold edge;
  bringing the second right inner fold edge outwardly to overlap the first right inner fold edge and the right outer fold edge;
  forming a second set of substantially opposed longitudinal folds in the upper and lower regions and folding a second portion of the upper region inwardly across the centerline, a fold line therefrom in the upper region defining a first left inner fold edge, and a fold line therefrom in the lower region defining a left outer fold edge;
  bringing the left outer fold edge inwardly toward the centerline;
  bringing the first left inner fold edge outwardly to overlap the left outer fold edge, thereby folding the airbag along a fold line defining a second left inner fold edge;
  bringing the second left inner fold edge outwardly to overlap the first left inner fold edge and the left outer fold edge;
  folding a proximal portion of the airbag a plurality of times along fold lines substantially transverse to an orientation of the longitudinal folds, thereby forming a first fold body; and
  folding the distal portion of the airbag a plurality of times along fold lines substantially transverse to the orientation of the longitudinal folds, thereby forming a second fold body.

15. The method of claim 14, further, comprising:
folding a first portion of the upper region along a fold line defining a right inner fold edge;
folding a first portion of the lower region along a fold line defining a right outer fold edge;
bringing the right inner fold edge and right outer fold edge toward one another;
folding a second portion of the upper region along a fold line defining a left inner fold edge;
folding a second portion of the lower region along a fold line defining a left outer fold edge;
    bringing the left inner fold edge and the left outer fold edge toward one another;
    folding a proximal portion of the airbag into a first fold body; and
    folding the distal portion of the airbag into a second fold body.

16. A method of folding an airbag, comprising:
tucking a part of a distal portion of an unfolded airbag into an interior of the airbag such that the distal portion is invaginated in the interior of the airbag forming a plurality of overlapping longitudinal folds in first and second halves of the airbag;
folding a proximal portion of the airbag a plurality of times along fold lines substantially transverse to an orientation of the longitudinal folds, thereby forming a first fold body; and
folding the distal portion of the airbag a plurality of times along fold lines substantially transverse to the orientation of the longitudinal folds, thereby forming a second fold body, wherein the step of folding the proximal portion of the airbag comprises folding the proximal portion in accordance with a first accordion fold incorporating a first plurality of accordion fold sections, wherein said first plurality of accordion fold sections are substantially parallel to one another and to a first direction when compressed together in said first fold body; and the step of folding the distal portion of the airbag comprises folding the distal portion in accordance with a second accordion fold incorporating a second plurality of accordion fold sections, wherein said second plurality of accordion fold sections are substantially parallel to one another and to a second direction when compressed together in said second fold body.

17. A method of folding an airbag as recited in claim 16, wherein said first and second directions are substantially perpendicular to one another.

18. A method of folding an airbag as recited in claim 16, further comprising the step of rolling or folding said second fold body in a distal direction.

19. A method of folding an airbag as recited in claim 17, further comprising the step of rolling or folding said second fold body in a distal direction.

20. An airbag folded according to a method comprising the steps of:
a. tucking a part of a distal portion of an unfolded airbag into an interior of the airbag;
b. forming a plurality of overlapping longitudinal folds in the first and second halves of the airbag, wherein the step of forming the plurality of overlapping longitudinal folds in the first and second halves of the airbag comprises:
  i. forming a first set of substantially opposed longitudinal folds in upper and lower regions of the airbag, and bringing a first portion of the upper region inwardly across a centerline, a fold line therefrom in the upper region defining a first right inner fold edge, and a fold line therefrom in the lower region defining a right outer fold edge;
  ii. forming a second set of substantially opposed longitudinal folds in the upper and lower regions and folding a second portion of the upper region inwardly across the centerline, a fold line therefrom in the upper region defining a first left inner fold edge, and a fold line therefrom in the lower region defining a left outer fold edge;
  iii. bringing the right outer fold edge inwardly toward the centerline;
  iv. bringing the first right inner fold edge outwardly to overlap the right outer fold edge, thereby folding the airbag along a longitudinal fold line defining a second right inner fold edge;
  v. bringing the second right inner fold edge outwardly to overlap the first right inner fold edge and the right outer fold edge;
  vi. bringing the left outer fold edge inwardly toward the centerline;
  vii. bringing the first left inner fold edge outwardly to overlap the left outer fold edge, thereby folding the airbag along a fold line defining a second left inner fold edge; and
  viii. bringing the second left inner fold edge outwardly to overlap the first left inner fold edge and the left outer fold edge;
c. folding a proximal portion of the airbag a plurality of times along fold lines substantially transverse to an orientation of the longitudinal folds, thereby forming a first fold body; and
d. folding the distal portion of the airbag a plurality of times along fold lines substantially transverse to the orientation of the longitudinal folds, thereby forming a second fold body.

* * * * *